United States Patent
Bruss et al.

(10) Patent No.: US 9,328,652 B2
(45) Date of Patent: May 3, 2016

(54) VEHICLE PARALLEL COOLING SYSTEM

(71) Applicant: Deere & Company, Moline, IL (US)

(72) Inventors: Paul T. Bruss, Cedar Falls, IA (US); Andy B. Appleton, Cedar Falls, IA (US); Adam J. Shuttleworth, Jesup, IA (US); Michael J. Schuller, Cedar Falls, IA (US); Kendall L. Giesmann, Waverly, IA (US)

(73) Assignee: DEERE & COMPANY, Moline, IL (US)

( * ) Notice: Subject to any disclaimer, the term of this patent is extended or adjusted under 35 U.S.C. 154(b) by 7 days.

(21) Appl. No.: 14/309,320

(22) Filed: Jun. 19, 2014

(65) Prior Publication Data

US 2015/0369114 A1    Dec. 24, 2015

(51) Int. Cl.
*F01P 11/08*    (2006.01)
*F02M 31/20*    (2006.01)
(Continued)

(52) U.S. Cl.
CPC ............... *F01P 11/08* (2013.01); *B60K 11/04* (2013.01); *F01P 3/00* (2013.01); *F01P 11/10* (2013.01); *F02B 29/0431* (2013.01); *F02B 29/0475* (2013.01); *F02M 31/20* (2013.01); *F01P 2003/185* (2013.01); *F01P 2003/187* (2013.01); *F01P 2060/02* (2013.01); *F01P 2060/04* (2013.01); *F01P 2060/10* (2013.01); *F01P 2060/14* (2013.01)

(58) Field of Classification Search
CPC ....... F01P 3/18; F01P 11/10; F01P 2003/182; F01P 2060/02; F01P 2060/04; F01P 2060/14; F01P 2003/185; F01P 2003/187; F01P 1/06; F01P 11/08; F01P 2001/005; F01P 29/0456

USPC ............ 123/41.33, 41.11, 41.1, 41.21, 41.29, 123/42.3
See application file for complete search history.

(56) References Cited

U.S. PATENT DOCUMENTS 7,325,518 B2    2/2008    Bering
7,806,091 B2    10/2010   Esau et al.
(Continued)

FOREIGN PATENT DOCUMENTS

EP    1770255    4/2007
WO    0114700    3/2001
WO    2007077491   12/2007

OTHER PUBLICATIONS

John Deere, "Cooling System", Images of John Deere production tractor cooling systems, date unknown but in production before invention of appln subject matter, (9 pages).
(Continued)

*Primary Examiner* — Stephen K Cronin
*Assistant Examiner* — Long T Tran

(57) ABSTRACT

A vehicle cooling system includes a fan, a radiator upstream of the fan and in a first air flow path, a charge air cooler upstream of the radiator in the first air flow path, a fuel cooler upstream of the radiator in the first air flow path, and a hydraulic oil cooler adjacent to a side of the radiator and upstream of the fan and in a second air flow path which is parallel to the first air flow path. A condenser is positioned in the first air flow path between the fuel cooler and the radiator. The hydraulic oil cooler has an upstream side which is unobscured by any other cooling system components. The hydraulic oil cooler includes first and second hydraulic oil cooler units connected together in series. A portion of the hydraulic oil cooler is positioned above a top side of the radiator.

12 Claims, 2 Drawing Sheets

(51) Int. Cl.
  *B60K 11/04* (2006.01)
  *F01P 11/10* (2006.01)
  *F02B 29/04* (2006.01)
  *F01P 3/00* (2006.01)
  *F01P 3/18* (2006.01)

(56) References Cited

U.S. PATENT DOCUMENTS

| | | | |
|---|---|---|---|
| 7,814,963 B2 * | 10/2010 | Adamson et al. | 165/41 |
| 7,896,062 B2 * | 3/2011 | Adamson et al. | 165/41 |
| 8,011,466 B2 | 9/2011 | Honzek et al. | |
| 8,505,499 B2 | 8/2013 | Hirasawa et al. | |
| 2005/0252635 A1 | 11/2005 | Adamson et al. | |
| 2010/0277973 A1 * | 11/2010 | Altounian | 365/163 |
| 2011/0088637 A1 * | 4/2011 | Hirasawa et al. | 123/41.31 |
| 2011/0277973 A1 * | 11/2011 | Foley | 165/148 |
| 2012/0325569 A1 * | 12/2012 | Takeda et al. | 180/68.1 |
| 2013/0333640 A1 * | 12/2013 | Kardos et al. | 123/41.1 |
| 2014/0116658 A1 * | 5/2014 | Kappelman et al. | 165/121 |

OTHER PUBLICATIONS

German Search Report issued in counterpart application No. 15163732.9 dated Oct. 23, 2015 (6 pages).

* cited by examiner

VEHICLE PARALLEL COOLING SYSTEM

FIELD

The present disclosure relates to a cooling system for a vehicle.

BACKGROUND

Operating a motor vehicle, such as an agricultural tractor, produces heat that must be rejected to the air through heat exchangers. A typical tractor cooling package will include a fan, a radiator, a charge air cooler, a hydraulic oil cooler, a condenser, and a fuel cooler. There have been many front cooling package designs for tractors all seeking to efficiently remove heat from the tractor. Typically, a fan is used to pull air through fluid filled heat exchangers. This fan is a major consumer of engine power. It is desired to provide an optimal cooling package taking into account space, airflow, and fan power consumed for a variety of loads. It is also desired to provide a practically efficient cooling package based upon the load cases most common to the actual users of the tractor.

U.S. Pat. No. 8,505,499 issued to Hirasawa, et al. on Aug. 13, 2013 discloses a cooling system for construction machine. In this cooling system, a radiator and an oil cooler are arranged at a front surface side of a cooling fan in parallel with each other in a flow direction of the cooling air. An intercooler or charge air cooler and a condenser are arranged in parallel at a front surface side of the radiator and oil cooler, and a fuel cooler is arranged at a front surface side of the condenser. However, the oil cooler is a single pass oil cooler, rather than dual pass. Also, an upper portion of the intercooler (or charge air cooler) completely covers or obscures an upstream side of the oil cooler. Thus, the oil cooler receives air that is already warmed by the inter-cooler. This drives a substantial amount of heat into the oil cooler and requires a larger oil cooler, increases the overall size of the entire cooling assembly and requires more fan power. It is desired to have a smaller oil cooler which is exposed to cooling air which has not previously passed through any other cooling unit.

SUMMARY

According to an aspect of the present disclosure, a vehicle cooling system includes a fan, a radiator upstream of the fan and in a first air flow path, a charge air cooler upstream of the radiator in the first air flow path, a fuel cooler upstream of the radiator in the first air flow path and adjacent to a side of the charge air cooler, and a hydraulic oil cooler adjacent to a side of the radiator and upstream of the fan and in a second air flow path which is parallel to the first air flow path. The cooling system may also include a condenser positioned in the first air flow path between the fuel cooler and the radiator. The cooling condenser is positioned adjacent to a bottom side of the charge air cooler and upstream of the radiator. The hydraulic oil cooler has an upstream side which is unobscured by any other cooling system components. The hydraulic oil cooler may include first and second hydraulic oil cooler units connected together in series. A portion of the first hydraulic oil cooler unit is positioned above a top side of the charge air cooler, and the second hydraulic oil cooler unit is positioned above a top side of the radiator. At least a portion of the hydraulic oil cooler is positioned above a top side of the radiator. The hydraulic oil cooler is exposed to cooling air which has not previously passed through any other cooling unit.

DETAILED DESCRIPTION OF THE DRAWINGS

Figure 1:
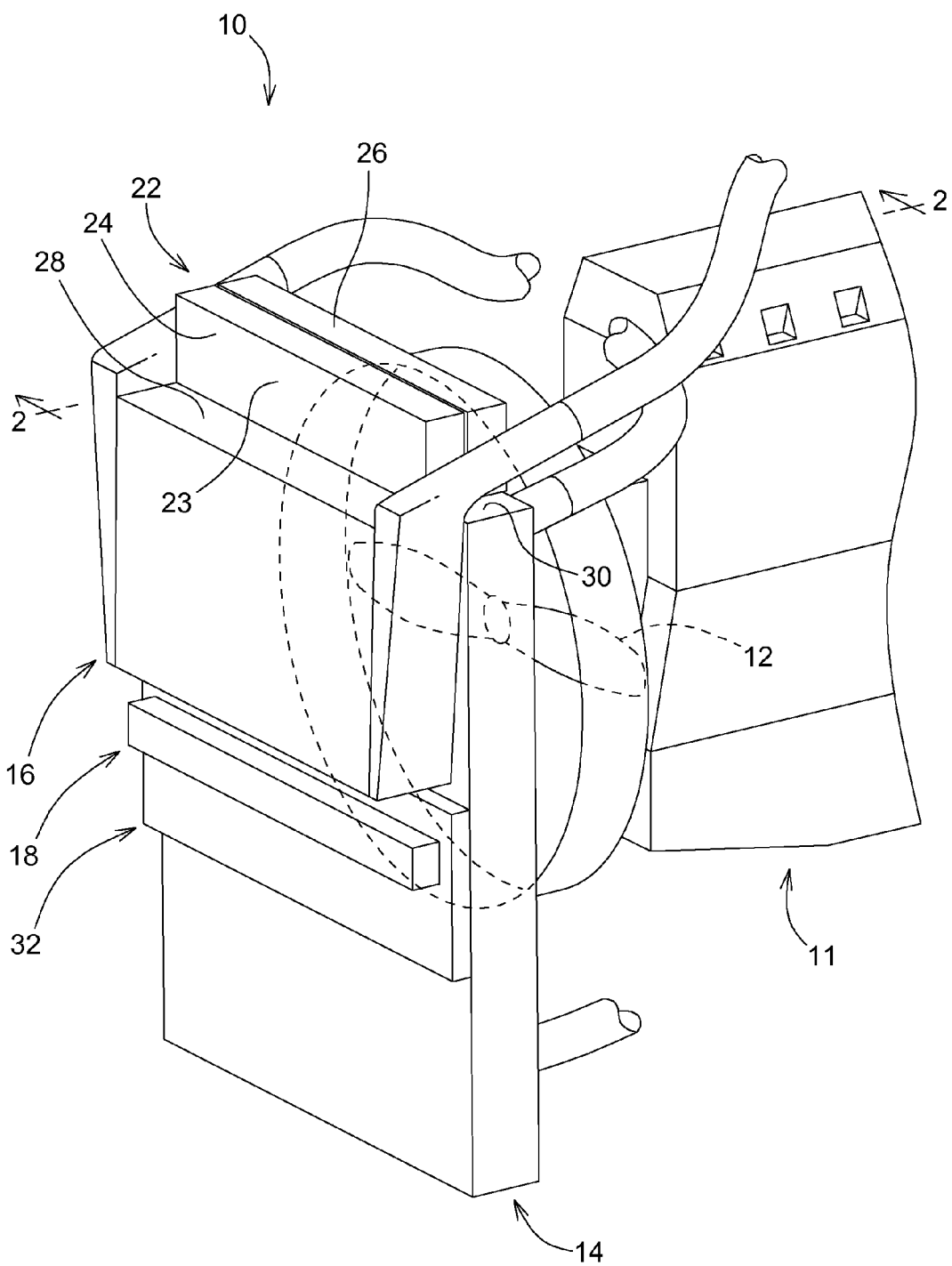
FIG. 1 is a perspective view of a cooling system embodying the invention.
Figure 2:
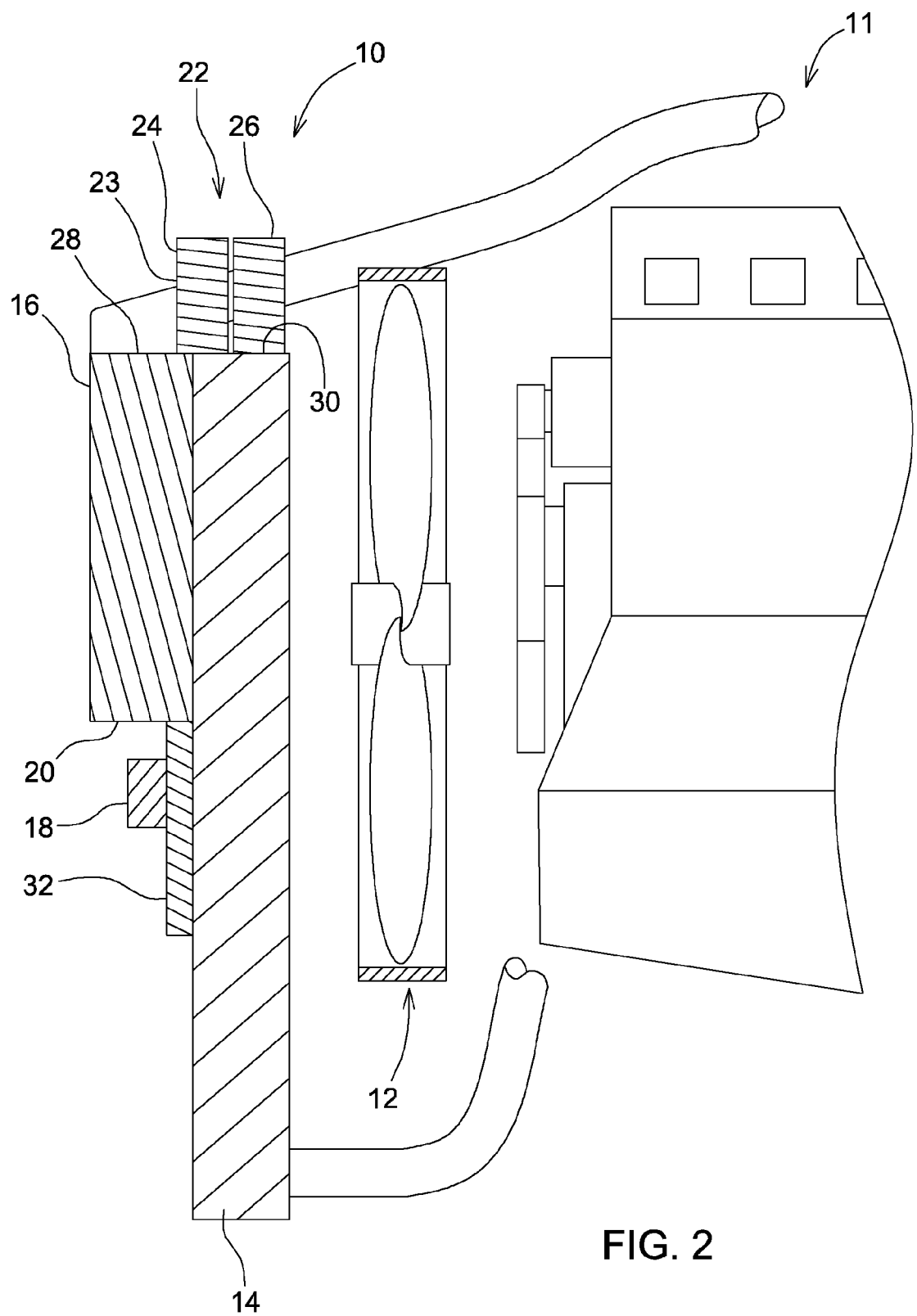
FIG. 2 is a left side view of the cooling system of FIG. 1 positioned in front of a vehicle engine.

Referring to FIGS. 1 and 2, a vehicle cooling system 10 for an engine 11 includes a fan 12 and a radiator 14. The fan 12 pulls air along a first air flow path from left to right into and through the radiator 14 and through the fan 12. A charge air cooler 16 is upstream of the radiator 14 and is also in the first air flow path. A fuel cooler 18 may be upstream of the radiator 14 in the first air flow path and is below and adjacent to a bottom side 20 of the charge air cooler 16. A hydraulic oil cooler 22 is upstream of the fan 12.

The hydraulic oil cooler 22 preferably is a dual pass cooler which includes a first upstream hydraulic oil cooler unit 24 and a second downstream hydraulic oil cooler unit 26. Units 24 and 26 are connected together in series with respect to the flow of coolant (not shown). As best seen in FIG. 2, a front or upstream portion of the first upstream hydraulic oil cooler unit 24 is preferably positioned above and adjacent to a top side 28 of the charge air cooler 16, and a rear or downstream portion of the first upstream hydraulic oil cooler unit 24 is preferably positioned above and adjacent to a top side 30 of the radiator 14. The second downstream hydraulic oil cooler unit 26 is preferably positioned above and adjacent to the top side 30 of the radiator 14. Thus, the fan 12 pulls air along a second air flow path from left to right into and through the oil cooler 22 and then through the fan 12. The second air flow path is parallel to the first air flow path. Preferably, the hydraulic oil cooler 22 has an upstream side 23 which is unobscured by any other cooling system components. As a result, the hydraulic oil cooler 22 is exposed to cooling air which has not previously passed through any other cooling unit.

Preferably, oil first enters the rear unit 26 (unit 26 is the last or downstream unit of cooler 22 in the second air flow). Then, the oil flows down to a tank and up into the front unit 24 (unit 24 is the first or upstream unit of cooler 22 in the second air flow path). Alternatively, the oil doesn't have to flow down then up—it can flow side to side, or up then down.

The cooling system 10 may also include a condenser 32 which is preferably positioned in the first air flow path between the fuel cooler 18 and the radiator 14. The condenser 26 is preferably positioned adjacent to the bottom side 20 of the charge air cooler 16.

The oil cooler 22 is placed so it is directly exposed to cooling air with no cooler in front of it and no cooler behind, so that the size of the oil cooler can be reduced. Placing the charge air cooler in front of the radiator caused the radiator to have to be larger, but the overall package remained relatively compact and low in airflow. The condenser and fuel cooler can be placed either in front of the radiator or in front of the charge air cooler. Due to the compact arrangement of the heat exchangers in combination with the use of a weighted usage profile, fan power consumption is reduced. It is believed that a shuttered or louvered airflow path for the oil cooler would further reduce the fan power required as air would only be pulled through as much of the oil cooler as required to keep the oil below a specified temperature. Less airflow means less power consumed by the fan or equivalently, better fuel economy.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. For example, a similar system could be turned upside down where the oil cooler was on bottom, or a similar system could be rotated at any angle. A similar system could be provided with a remote mounted condenser (absent from the cooling package in front of the machine). A similar system could be provided without a charge air cooler, where air-to-coolant methods are used to cool the charge air. A similar system could be provided where the condenser, charge air cooler and fuel cooler can be any combination of present/absent and series/parallel in the first air stream in front of the radiator. Or, a similar system could have with independent fans for the two air streams. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A vehicle cooling system, comprising:
a fan;
a radiator upstream of the fan and in a first air flow path;
a fuel cooler upstream of the radiator in the first air flow path and adjacent to a side of a charge air cooler; and
a hydraulic oil cooler adjacent to a side of the radiator and upstream of the fan and in a second air flow path which is parallel to the first air flow path, the hydraulic oil cooler comprising first and second hydraulic oil cooler units connected together in series.

2. The cooling system of claim 1, further comprising:
a condenser positioned in the first air flow path between the fuel cooler and the radiator.

3. The cooling system of claim 1, further comprising:
a condenser positioned adjacent to a side of the charge air cooler between the radiator and the fuel cooler.

4. The cooling system of claim 1, further comprising:
a condenser positioned below a bottom side of the charge air cooler and upstream of the radiator.

5. The cooling system of claim 1, wherein:
the hydraulic oil cooler has an upstream side which is unobscured by any other cooling system components.

6. The cooling system of claim 1, wherein:
a portion of the first hydraulic oil cooler unit is positioned above a top side of the charge air cooler, and the second hydraulic oil cooler unit is positioned above a top side of the radiator.

7. The cooling system of claim 1, wherein:
at least a portion of the hydraulic oil cooler is positioned above a top side of the radiator.

8. The cooling system of claim 1, wherein:
the hydraulic oil cooler is exposed to cooling air which has not previously passed through any other cooling unit.

9. The cooling system of claim 1, further comprising:
a charge air cooler upstream of the radiator in the first air flow path.

10. A vehicle cooling system, comprising:
at least one fan;
a radiator upstream of the fan and in a first air flow path;
a plurality of cooler units upstream of the radiator in the first air flow path, the plurality of cooler units comprising at least two of a charge air cooler, a fuel cooler, or a condenser; and
a dual pass hydraulic oil cooler adjacent to a side of the radiator and upstream of the fan and in a second air flow path which is parallel to the first air flow path.

11. The cooling system of claim 10,
wherein the condenser is positioned in the first air flow path between the fuel cooler and the radiator.

12. The cooling system of claim 10,
wherein the condenser is positioned adjacent to a side of the charge air cooler between the radiator and the fuel cooler.

* * * * *